United States Patent [19]
Bertolini

[11] Patent Number: 4,635,742
[45] Date of Patent: Jan. 13, 1987

[54] EXTENDABLE CHASSIS
[75] Inventor: William A. Bertolini, Montague, N.J.
[73] Assignee: JD-Bertolini Industries, Ltd., Compton, Calif.
[21] Appl. No.: 692,505
[22] Filed: Jan. 18, 1985
[51] Int. Cl.⁴ .................... B62D 53/06; B62P 1/18
[52] U.S. Cl. .................... 180/209; 280/80 B; 280/287; 280/414.5
[58] Field of Search ........... 180/209; 280/638, 415 R, 280/415 B, 423 R, 475, 287, 80 B, 414.5, 704, 785, 81 R

[56] References Cited
U.S. PATENT DOCUMENTS

| | | | |
|---|---|---|---|
| 2,835,504 | 5/1958 | Acker | 280/81 R |
| 2,900,198 | 8/1959 | Patton | 280/404 |
| 2,953,390 | 9/1960 | Hogstrom | 410/32 |
| 2,962,295 | 11/1960 | Tenenbaum | 280/81 R |
| 3,112,935 | 12/1963 | Gregg et al. | 280/81 R |
| 3,161,418 | 12/1964 | Brennan et al. | 180/209 |
| 3,197,237 | 7/1985 | Smith | 280/415 B |
| 3,239,274 | 3/1966 | Weiss | 298/17 R |
| 3,348,861 | 10/1967 | Curtis et al. | 280/475 |
| 3,374,010 | 3/1968 | Crockett et al. | 280/415 B |
| 3,410,576 | 11/1968 | Turpen | 280/423 R |
| 3,537,727 | 11/1970 | Tantlinger et al. | 280/415 B |
| 3,667,777 | 6/1972 | Enriquez | 180/209 |
| 3,778,079 | 12/1973 | Vornberger et al. | 280/80 B |
| 3,869,149 | 3/1975 | Dixon | 280/475 |
| 3,870,336 | 3/1975 | Bilas | 280/704 |
| 3,910,601 | 10/1975 | Michaud | 280/415 R |
| 4,033,625 | 7/1977 | Fikse | 280/80 B |
| 4,136,909 | 1/1979 | Duttarer | 298/17 B |
| 4,230,334 | 10/1980 | Mabry | 280/415 R |
| 4,286,797 | 9/1981 | Mekosh | 280/80 B |
| 4,350,222 | 9/1982 | Lutteke et al. | 180/209 |

Primary Examiner—Richard A. Bertsch
Attorney, Agent, or Firm—Elliot M. Olstein; Raymond J. Lillie

[57] ABSTRACT

An extendable chassis is provided with an additional axle which is moved to a position with the wheels thereof on the ground when the chassis is extended and to a position with the wheels off the ground when the chassis is retracted. The chassis also includes means for automatically tripping a means for locking the chassis after a preselected extension or retraction thereof.

12 Claims, 6 Drawing Figures

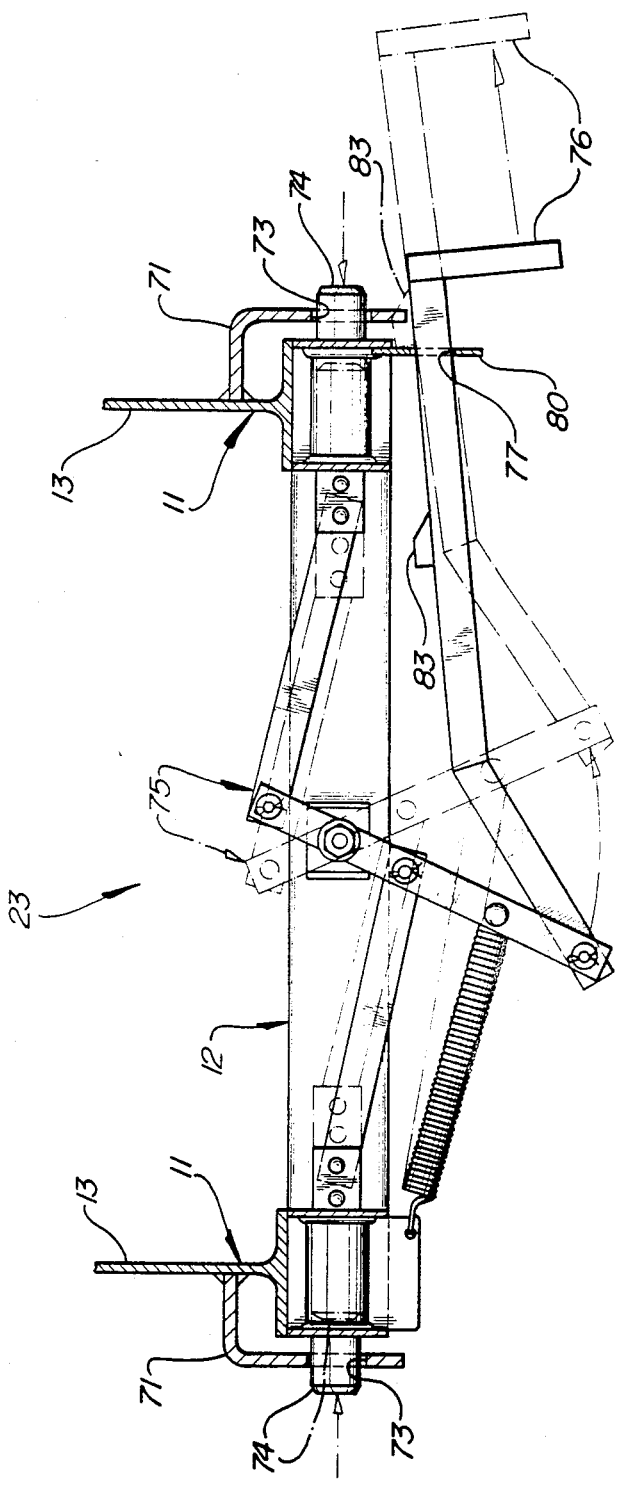

EXTENDABLE CHASSIS

This invention relates to a chassis, and more particularly to an extendable chassis which is adapted for transporting containers.

A container chassis is formed from a main frame with a wheeled undercarriage at the rear, and a fifth wheel connection member, at the forward end, for connecting the chassis to a highway tractor for pulling the chassis over a highway in the same manner as a conventional semi-trailer. A container is supported on the main frame.

Container chasses are generally designed to carry standard size marine cargo containers, which are generally 20 ft. or 40 ft. units. The carrying capacity of the chassis is governed by state and federal laws which dictate maximum loads that may be imposed on an axle or pair of axles. Many states (and recently, the Federal Government) have so-called "Bridge Formulas" which penalize groups of axles directly proportional to their spacing; the closer the spacing, the larger the penalty. As a result of such so-called Bridge Laws, container chasses have been constructed, in many cases, in a form such that the chassis may be extended in a manner to increase the distance between the rear wheels of the chassis and the wheels of the attached tractor. The increase in distance between the wheels permits an increase in the carrying load.

Although such extendable chasses have permitted an increase in the load which can be carried by the chassis, there is still a need for further improvement so as to permit a further increase in the load carrying capacity of such chasses.

In accordance with one aspect of the present invention, there is provided a chassis which is specifically adapted for carrying a container, which is comprised of a main frame and a wheeled underframe which are connected to each other in a manner such that the length of the chassis can be extended by relative longitudinal movement between the main frame and the underframe. The chassis may be moved between a retracted position, wherein the rear of the main frame overlies the rear of the underframe, and an extended position, wherein the rear of the main frame overlies an intermediate portion of the underframe. The chassis is further provided with an additional axle which is positioned and supported in a manner such that the wheels of the additional axle are off the ground when the chassis is in a retracted position, and on the ground when the chassis is in an extended position.

In this manner, there is provided an additional axle for the axle count inherent in a "bridge formula", which increases the carrying capacity of the chassis.

More particularly, the additional axle is supported on the chassis in a manner such that the axle is automatically lowered when the chassis is extended, and the axle is automatically raised when the chassis is in a retracted position. In accordance with a preferred embodiment of the invention, such a result is achieved by supporting the additional axle in a manner such that there is relative fore and aft movement between the additional axle and the main frame from a forward elevated position to a rearward lowered position with respect to the main frame during extension and retraction of the chassis, while fore and aft movement between the underframe and additional axle is restrained. This may be accomplished by supporting the additional axle on a track on the main frame, while fixing the additional axle with respect to fore and aft movement with respect to the underframe. The track includes an inclined portion connecting a forward elevated portion with a rearward lowered portion, whereby upon extension of the chassis, the axle moves on the track from the raised or elevated forward position to the lowered rear position, and upon retracting of the chassis, the axle moves on the track from the lowered rear position to the elevated forward position.

In accordance with a preferred aspect of the present invention, the additional axle is employed primarily for the purpose of increasing the axle count and may or may not be used as a load-bearing axle. As a result, the additional axle may be sprung or supported with light duty springs, and equipped with single tires, rather than dual tires.

In accordance with another aspect of the present invention, there is provided a locking assembly for automatically locking the chassis at preselected extended and retracted positions.

The invention will be further disclosed with respect to embodiment thereof illustrated in the accompanying drawings, wherein:

FIG. 6 is a sectional view along line 6—6 of FIG. 2 depicting the locking assembly.

Figure 1:
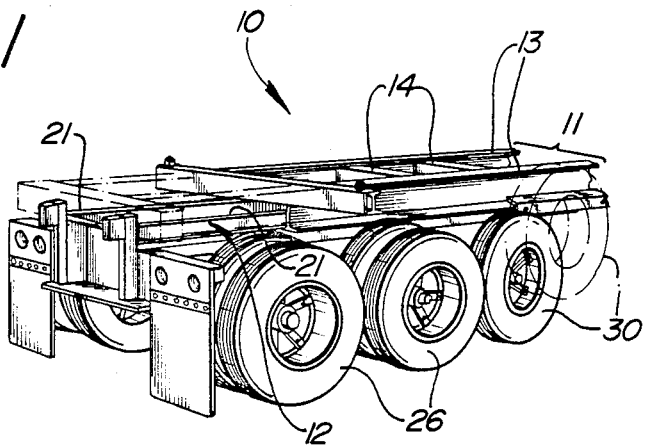
FIG. 1 is an isometric view of an embodiment of a chassis of the present invention.
Figure 2:
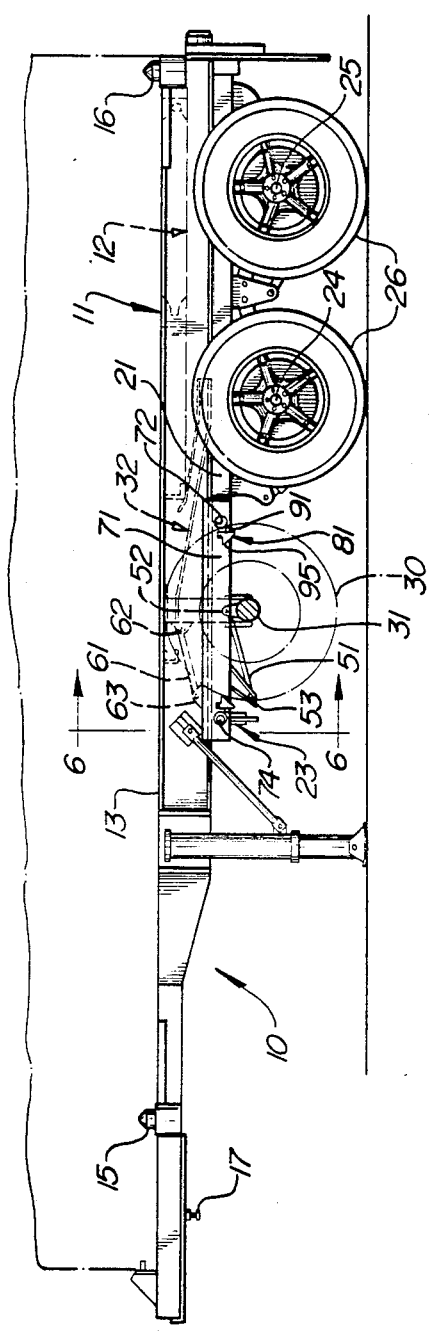
FIG. 2 is a side elevation of the chassis in a retracted position, showing the additional axle, in phantom, in a raised position.
Figure 3:
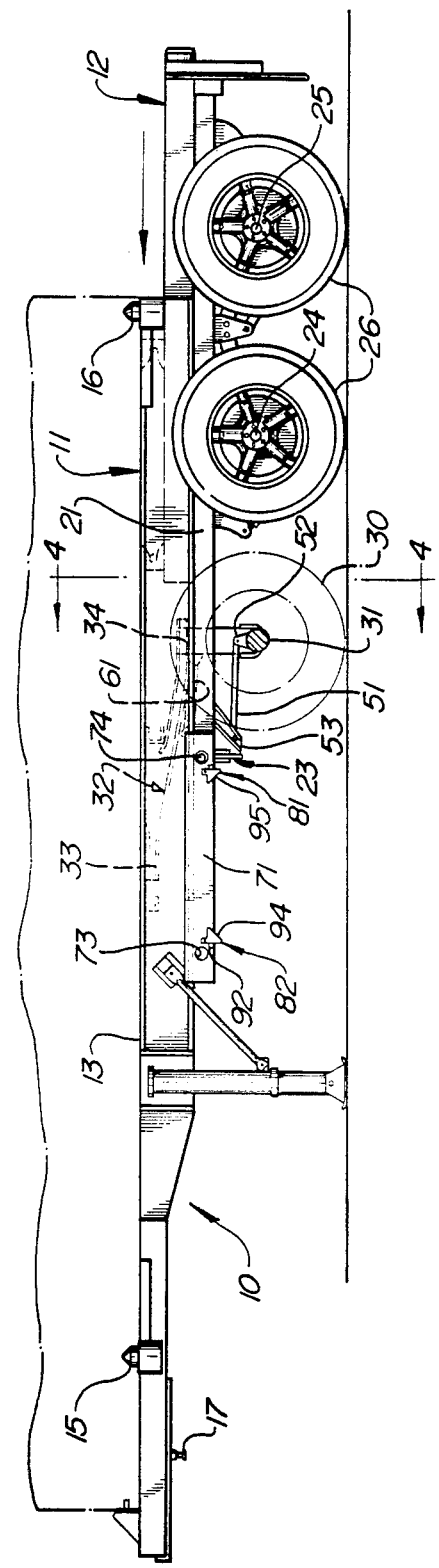
FIG. 3 is a side elevation of the chassis in an extended position, showing the additional axle in a lowered position.

Referring now to the drawings, there is shown in FIGS. 1, 2 and 3 a container chassis generally indicated as 10, comprised of an elongated main frame or assembly 11, and an underframe or assembly 12. The main frame 11 is comprised of a pair of main I-beam members 13, and cross-members 14. The main frame is further provided with front and rear bolsters 15 and 16, respectively, for restraining fore and aft movement of a container supported on the main frame 11. The main frame 11 also includes a king pin 17 for releasably attaching the chassis to the "fifth wheel" of a tractor for hauling the chassis over the road.

The rear portion of the main frame 11 is supported on the underframe 12 for relative movement therebetween so as to permit extension of the chassis length. As shown, the pair of I-beams 13 of the main frme are supported in sliding contact on a pair of channel beams or rails 21 of the underframe 12 (see FIG. 4). The main frame 11 may be moved between a retracted position (FIG. 2) in which the rear of the main frame 11 is adjacent to the rear of the sub-assembly 12, and an open or extended position, wherein the rear of the main frame 11 is at an intermediate point of the sub-assembly 12 (FIG. 3). The main frame 11 and sub-assembly 12 are provided with a suitable locking mechanism (of a type available in the art) for releasably locking the main frame 11 to the sub-assembly 12 so as to permit and prevent relative movement therebetween. The locking assembly is generally indicated in FIGS. 2, 3 and 6 as 23, and is hereinafter described in more detail.

The sub-assembly 12 supports first and second axles 24 and 25, each of which includes a pair of dual tires 26.

The chassis 10 is further provided with an additional or third axle 31 which is supported by a support means which automatically raises and lowers the third axle so that the wheels 30 thereof are above the ground when the chassis is in a retracted position (FIG. 2), and are on the ground when the chassis is in an extended position (FIG. 3).

Figure 5:
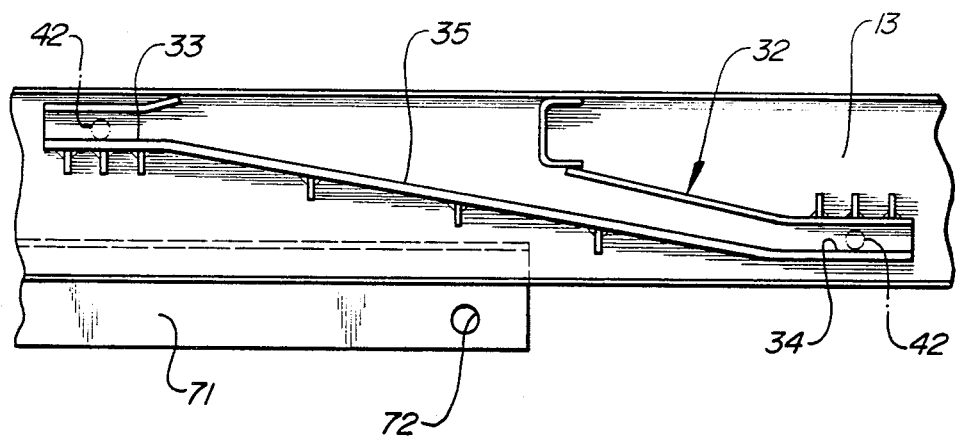
FIG. 5 is a side elevation of a portion of the track assembly for raising and lowering the additional axle.
Figure 4:
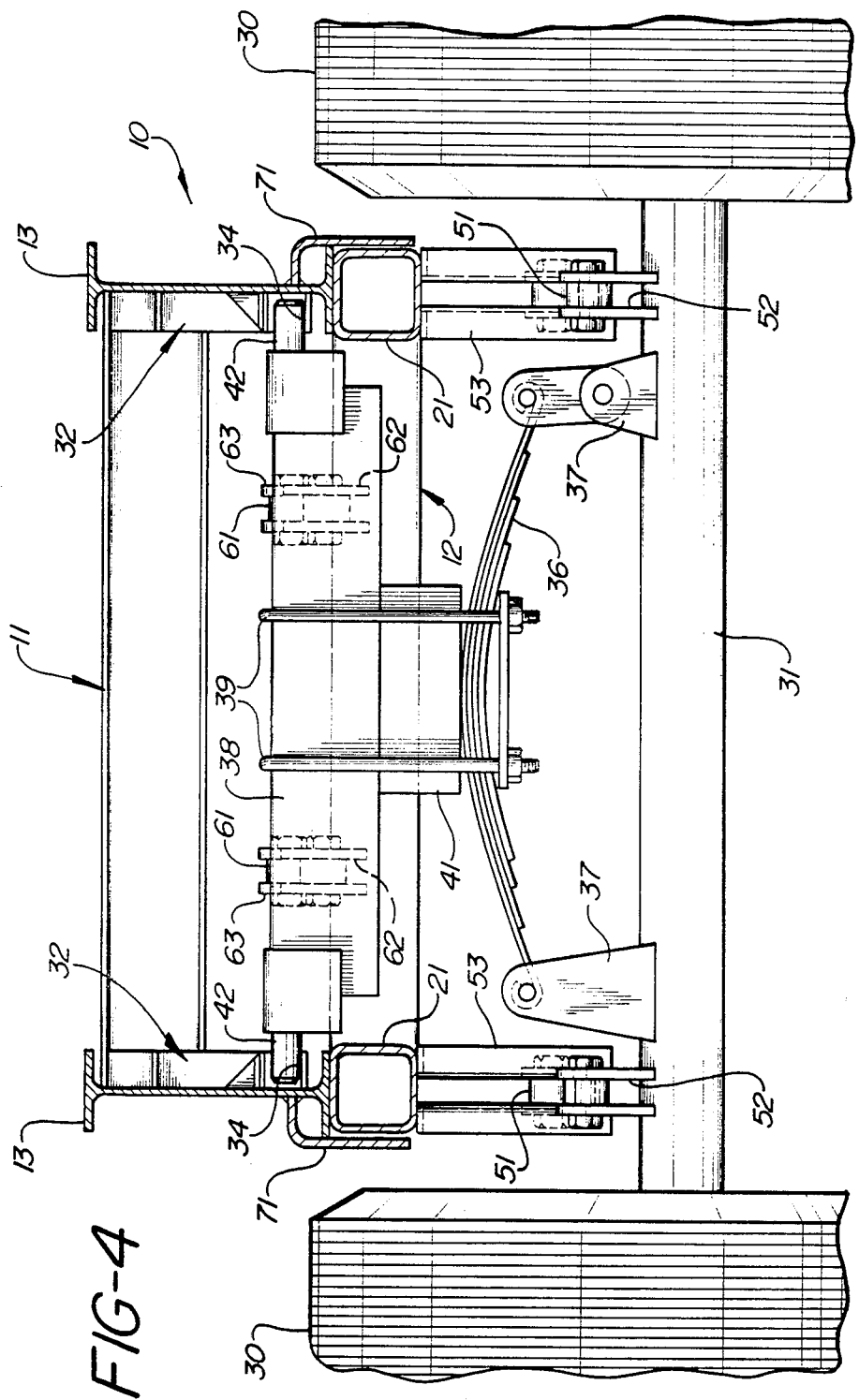
FIG. 4 is a section along the line 4—4 of FIG. 3.

Referring particularly to FIGS. 4 and 5, the support means for the additional axle 31, includes an axle lift track formed from parallel guides or rails generally indicated as 32, which are supported on the interior portion of the I-beams 13 of the main frame or assembly 11. The rails 32 include a forward elevated or raised portion 33, and a rearward lower portion 34, which are interconnected by an intermediate inclined portion 35. Thus, the track formed by the parallel rails 32 inclines rearwardly from the forward elevated portion 33 to the rearward lower portion 34.

The additional axle 31 is supported by a transverse axle spring 36 which is connected to the additional axle 31 through spring shackles 37. The springs 36 laterally stabilize the additional axle 31 in both the raised and lowered positions. The springs 36 are supported by a spring bar 38 which is connected to the springs through "U" bolts 39 and spacer 41. The ends of the spring bar 38 include a pair of guides 42 which are each supported for movement on a rail 32 of the axle lift track. The spring guides 42 are slidably supported on the rails 32 for movement between the elevated portion 33 and the lower portion 34 of the rails 32 Accordingly, the additional axle is supported on the chassis 10 in a manner such that the third axle 31 is capable of being moved with respect to the main frame or assembly 11 between a raised or elevated portion 33 and a lower portion 34.

The additional axle 31 is mounted in a manner such that it is stabilized against fore and aft movement with respect to the sub-assembly 12. As shown in FIGS. 2 and 3 of the drawings, a pair of radius rods 51 are connected to the end portion of the third axle 31 by suitable clamps 52 and to the sub-assembly 12 by hanger brackets 53. The radius rods 51 are pivotably connected to the clamps 52 to permit raising and lowering of the additional axle 31 with respect to the sub-assembly 12 while restraining fore and aft movement of the additional axle 31 with respect to the sub-assembly 12.

Similarly, a pair of upper radius rods 61 are connected to the spring bar 38 by suitable clamps 62 and to the sub-assembly 12 by hanger brackets 63. The rods 61 are pivotably connected to the clamps 62 to permit raising and lowering of the axle 31 while restraining fore and aft movement thereof. The pair of rods 51 and pair of rods 61 form a parallelogram.

The top or elevated portion 33 of rail 32 is positioned at a height such that when the spring guides 42 are in the elevated forward position 33, the wheels 30 of the additional axle 31 are raised above the ground. The bottom rearward portion 34 of the rails 32 are positioned at a height above the ground such that when the spring guides 42 are in the lower portion 34 of the track 32, the wheels 30 of the additional axle 31 are on the ground.

The pivotal connection between the radius rods 51 and 61 and the clamps 52 and 62, respectively, permit raising and lowering of the third axle with respect to the sub-assembly 12, when there is relative movement between the third axle and the main-frame 11 in the fore and aft directions while preventing fore and aft movement of the additional axle 31 with respect to the sub-assembly 12.

As should be apparent, the distance between the additional axle 31 and the closest axle 25 is fixed, even though the additional axle 31 is raised and lowered during extension and retraction of the chassis 10.

Referring now to FIG. 2, 3 and 6, the locking assembly 23 includes as principal components an apron 71 on each side of the main frame 11, with each of the aprons 71 including first aligned apertures 72 at a rear portion thereof and second aligned apertures 73 at a forward portion thereof for receiving a pair of aligned retractable locking pins 74 retractably connected to the underframe 12. The retractable pins 74 are connected through a linkage assembly generally indicated as 75 to a handle 76 which extends through a slot 77 in an apron 80 on one side of the underframe 12.

As should be apparent, by pulling the handle 76 outwardly, the pins 74 are retracted from the apertures 73 whereby the main frame 11 and underframe 12 are released from each other for relative movement.

In accordance with one aspect of the present invention, the apron 71 of the main assembly 11 which is on the side of the handle 76 includes a pre-selection or tripping mechanism for tripping the cocked locking pins 74 as the pins 74 approach a locking aperture during relative movement between the main frame 11 and sub-assembly 12. The pre-selection mechanism is comprised of a first cam member 81 which is mounted forward of rearward aperture 72 for pivotal movement by the handle 76 only in the clockwise direction and a second cam member 82 which is mounted rearward of forward aperture 73 for pivotal movement by the handle 76 only in the counter-clockwise direction. A stop member 91 rearward of member 81 prevents movement of member 81 in the counter-clockwise direction and a stop member 92 forward of member 82 prevents movement of member 82 in the clockwise direction.

The handle 76 includes a raised portion 83 which, upon outward movement of the handle 76, maintains the locking pins 74 in a cocked or retracted position by engaging the exterior portion of apron 80 above slot 77. As should be apparent, the cocked locking pins 74 can be tripped by forcing the handle 76 downwardly so that the raised portion 83 moves through the slot 77.

If the pins 74 are originally engaged in the rearward apertures 72, upon relative movement between the main frame 11 and sub-assembly 12, with the pins 74 in a cocked position, the handle initially contacts the first member 81 which causes the member 81 to pivot in the clockwise direction so that the handle can move past member 81, after which member 81 returns to its original position. Upon contacting member 82, rearward of aperture 73, the handle 76 is forced downwardly along a camming surface 94 of member 82, whereby the raised portion 83 of handle 76 moves through the aperture 77 which trips the cocked pins 74 for locking in apertures 73.

Similarly, when the pins 74 are engaged in the forward apertures 73, in a cocked position, the handle moves past member 82 by pivoting member 82 in the counter-clockwise direction, and the handle 76, upon contacting member 81 is forced downwardly along the camming surface 95 of member 81, whereby the raised portion 83 of handle 76 moves through aperture 77 which trips the cocked pins 84 for locking in apertures 72.

In this manner, a driver can unlock the main frame 11 and underframe 12 for relative movement and after relative movement between the main assembly 11 and sub-assembly 12, the assembly is automatically locked in the preselected extended or retracted position.

In a typical operation, at dockside, a loaded container, for example, a 20 ft. container, is placed on the chassis while it is in a retracted or closed position (FIG. 2). Although the container may be loaded on the chassis 10 when it is in an extended position, for the sake of simplicity, the operation will be described with respect to a retracted chassis.

After placing the container on the chassis, the pins which prevent relative movement between the main frame 11 and the sub-assembly 12 are retracted, with the chassis brakes being locked, and the main frame 11, including the container, is moved forward until the chassis has been extended; for example, by about four ft. As the main frame 11 is moved forward, the third axle 31 is automatically moved from a raised or elevated position to a lowered position wherein the wheels 30 are on the ground. More particularly, as the main frame or assembly is moved forward, the guides 42 slide rearwardly and downwardly on the inclined portion 35 from the raised forward portion 33 to the rearward lower portion 34 of the rails 32, whereby the wheels of the additional axle 31 are lowered to the ground. The locking pins automatically move into the appropriate aperture on the locking assembly 22, whereby the chassis is locked in its extended position. The chassis may now be hauled over the road with the benefit of increased carrying capacity as a result of the increased wheelbase and the additional axle. As previously indicated, the springs 36 may be light duty springs in that the additional axle 31 is not intended to be a load-bearing axle, although it is possible to provide the additional axle as a load-bearing axle.

At the destination, the driver reverses the hereinabove described process by locking the chassis brakes and releasing the locking assembly to permit sliding of the main frame 11 rearwardly with respect to the sub-assembly 12. As the main assembly 11 is moved rearwardly, the third axle is automatically moved to a raised position with the wheels thereof off the ground. More particularly, as the main frame is moved rearwardly, the spring guides 42 move upwardly and forwardly on the inclined portion 35 from the rear lower portion 34 to the forward elevated portion 33 of the rails 32 whereby the wheels 30 are lifted off the ground.

Although the invention has been described with respect to a preferred embodiment, it is to be understood that the scope of the invention is not limited to the particularly described embodiment. Thus, such an embodiment may be modified within the spirit and scope of the present invention.

For example, the mechanism for providing relative movement between the main frame and the sub-assembly may be other than as particularly described. Similarly, the specific mechanism for raising and lowering the additional axle may be modified within the spirit and scope of the present invention provided that the additional axle is supported in a manner such that the tires of the additional axle are on the ground when the chassis is in an extended position, and off the ground when the chassis is in a retracted position.

Thus, for example, raising and lowering of the third axle may be accomplished by use of a pneumatic system, rather than a track as particularly shown. In such a modification, the pneumatic mechanism is triggered by extension and retraction of the chassis.

It is also to be understood that the locking assembly may be used with an extendable chassis independently of an additional axle; i.e., an extendable chassis without an additional axle.

It is further to be understood that the extendable chassis may be manufactured with a supporting means for supporting an additional axle for raising and lowering the wheels of the additional axle to a position off the ground when the chassis is in a retracted position and to a position on the ground when the chassis is in an extended position for the purpose of adding the additional axle at a later time. Moreover, it is possible to remove the additional axle from the chassis and replace it at a later time so that the chassis may be used with or without the additional axle. Thus, as shown in the drawings, the chassis is constructed with the axle lift track formed from rails 32, and it is possible to remove the axle 31, including the springs 36, spacer 41, spring bar 38 and guides 42 from the chassis by disconnecting the radius rods 51 and 61 from the hanger brackets 53 and 63. As shown in FIG. 5, there is an open portion above the inclined portion 35 of the tracks 32, whereby the additional axle and support portions may be lifted from the tracks 32 for removal from the chassis. Thus, as should be apparent, the chassis may be employed with or without the additional axle and offers the advantage that the additional axle may be easily added to the chassis for automatic raising and lowering of the additional axle during retraction and extension of the chassis, respectively.

Since such modifications are deemed to be within the scope of those skilled in the art, no details in this respect are deemed necessary for a complete understanding of the present invention.

The present invention is particularly advantageous in that it permits an increase in the load carrying capacity of a container chassis.

The "Bridge Formula" is quoted as follows: $W = 500 (LN)/(N-1) + 12N + 36$ where "W" is the capacity of any group of axles under consideration, "L" is the distance in feet between the first and rear axle in the group and "N" is the number of axles in the group. It can readily be seen that "W" increases dramatically with an increase in "L", but it also increases with an increase in "N", the number of axles. A simultaneous increase in both "L" and "N" is more advantageous than an increase in only one of "L" and "N".

Moreover, such a result is easily accomplished in that the additional axle is automatically raised and lowered upon retracting and extending the chassis.

The present invention has particular applicability to container chasses which are designed for carrying 20 ft. container units. In general, such chasses have a nominal length of 23'6", and can be extended by about 4 ft. to allow the axles to be placed in a position of optimum weight distribution. It is to be understood, however, that the scope of the present invention is not limited to the preferred chassis for carrying 20 ft. containers and is equally applicable to other chasses. Similarly, the present invention is not limited to chasses which are adapted for carrying containers.

Numerous modifications and variations of the present invention are possible in light of the above teachings and, therefore, within the scope of the appended claims, the invention may be practiced otherwise than as particularly described.

What is claimed is:

1. A chassis, comprising:
   a main frame; a wheeled underframe generally planar-parallel with respect to the main frame; means connecting the main frame to the underframe for relative movement between a retracted position and an extended position to decrease and increase the length of the chassis, an additional axle including wheels, and supporting means supporting the additional axle for raising the wheels of the additional axle to a position off the ground upon retraction of the chassis and for lowering the wheels of the additional axle to a position on the ground upon extension of the chassis.

2. The chassis of claim 1 wherein the supporting means includes means for automatically raising and lowering the wheels of the additional axle upon retraction and expansion of the chassis.

3. The chassis of claim 1 wherein the supporting means comprises a track means on the main frame having a forward elevated portion and a rearward lower portion and an inclined intermediate portion connecting the forward and rearward portions; first means for supporting the additional axle on the track means for movement between the forward elevated portion and the rearward lower portion; and stabilizing means for stabilizing the additional axle against forward and rearward movement with respect to the underframe, whereby upon relative movement between the main frame and the underframe, the additional axle moves with respect to the main frame to raise and lower the axle and is restrained against movement with respect to the underframe.

4. The chassis of claim 1 wherein the supporting means supports the additional axle for relative forward and rearward movement with respect to the main frame between raised and lowered positions and restrains forward and rearward movement with respect to the underframe during raising and lowering of the additional axle.

5. The chassis of claim 1 and further comprising locking means for releasably locking and unlocking the main frame and underframe and a tripping means for automatically actuating the locking means to lock the main frame and underframe at preselected extended and retracted positions after preselected relative movement between the main frame and underframe.

6. The chassis of claim 5 wherein the locking means comprises retractable pin means connected to the underframe, a first forward aperture and a second rearward aperture on the main frame for receiving the pin means in chassis retracted and extended positions, respectively; a handle means, a linkage means connecting the handle means to said pin means, said handle and linkage means moving and maintaining the pins in a cocked, unlocked, retracted position to permit relative movement between the main frame and underframe, said tripping means comprising a first member on the main frame rearward of the forward aperture, said first member tripping the cocked, unlocked pin means only during movement of the pin means toward the first aperture and a second member in the main frame forward of the rearward aperture, said second member tripping the cocked, unlocked pin means only during movement of the pin means toward the second aperture.

7. The chassis of claim 6 wherein the first member is a first camming means, said first camming means contacting and moving said handle means to release the cocked, retracted pin means for locking in the first aperture during movement towards the first aperture and contacting and being moved by said handle means to maintain the pin means in a cocked, retracted, unlocked position during movement away from the first aperture, and said second member is a second camming means, said second camming means contacting and moving the handle means to release the cocked, retracted pin means for locking in the second aperture during movement toward the second aperture and being moved by said handle means to maintain the pin means in a cocked, retracted, unlocked position during movement away from the second aperture.

8. A chassis comprising:
   a main frame; a wheeled underframe; means connecting the main frame to the underframe for relative movement between a retracted position and an extended position to decrease and increase the length of the chassis; non-electronic, non-pneumatic locking means for releasably locking and unlocking the main frame and underframe; and non-electronic, non-pneumatic tripping means actuated by relative movement between the main frame and the underframe to automatically move the locking means to lock the main frame and underframe at preselected extended and retracted positions after preselected relative movement between the main frame and underframe.

9. The chassis of claim 8 wherein the locking means comprises retractable pin means connected to the underframe, a first forward aperture and a second rearward aperture on the main frame for receiving the pin means in chassis retracted and extended positions, respectively; a handle means, a linkage means connecting the handle means to said pin means, said handle and linkage means moving and maintaining the pins in a cocked, unlocked, retracted position to permit relative movement between the main frame and underframe, said tripping means comprising a first member on the main frame rearward of the forward aperture, said first member tripping the cocked, unlocked pin means only during movement of the pin means toward the first aperture and a second member in the main frame forward of the rearward aperture, said second member tripping the cocked, unlocked pin means only during movement of the pin means toward the second aperture.

10. The chassis of claim 9 wherein the first member is a first camming means, said first camming means contacting and moving said handle means to release the cocked, retracted pin means for locking in the first aperture during movement towards the first aperture and contacting and being moved by said handle means to maintain the pin means in a cocked, retracted, unlocked position during movement away from the first aperture, and said second member is a second camming means, said second camming means contacting and moving the handle means to release the cocked, retracted pin means for locking in the second aperture during movement toward the second aperture and being moved by said handle means to maintain the pin means in a cocked, retracted, unlocked position during movement away from the second aperture.

11. A chassis, comprising a main frame; a wheeled underframe; means connecting the main frame to the underframe for relative movement between a retracted position and an extended position to decrease and increase the length of the chassis; and supporting means for supporting and additional axle assembly in a raised position upon retraction of the chassis and for bringing the axle assembly to a lowered position upon extension of the chassis.

12. The chassis of claim 11 wherein the supporting means comprises a track means having an elevated portion, a lower portion and an inclined portion connecting the elevated and lower portions.

* * * * *